US011462023B2

United States Patent
Kehl et al.

(10) Patent No.: US 11,462,023 B2
(45) Date of Patent: Oct. 4, 2022

(54) SYSTEMS AND METHODS FOR 3D OBJECT DETECTION

(71) Applicant: Toyota Research Institute, Inc., Los Altos, CA (US)

(72) Inventors: Wadim Kehl, Mountain View, CA (US); Sergey Zakharov, Kirchseeon (DE)

(73) Assignee: Toyota Research Institute, Inc., Los Altos, CA (US)

( * ) Notice: Subject to any disclaimer, the term of this patent is extended or adjusted under 35 U.S.C. 154(b) by 339 days.

(21) Appl. No.: 16/853,953

(22) Filed: Apr. 21, 2020

(65) Prior Publication Data

US 2021/0149022 A1    May 20, 2021

Related U.S. Application Data

(60) Provisional application No. 62/935,246, filed on Nov. 14, 2019.

(51) Int. Cl.
*G06V 20/58* (2022.01)
*G06T 7/70* (2017.01)
(Continued)

(52) U.S. Cl.
CPC ....... *G06V 20/584* (2022.01); *B60W 60/0027* (2020.02); *G01S 7/4802* (2013.01);
(Continued)

(58) Field of Classification Search
CPC ...... G06V 20/584; G06V 20/64; G06V 10/82; G06V 20/56; B60W 60/0027;
(Continued)

(56) References Cited

U.S. PATENT DOCUMENTS

2018/0136332 A1\*  5/2018  Barfield, Jr. .......... G01S 7/4802
2018/0322371 A1   11/2018  Dupont De Dinechin
2019/0286932 A1    9/2019  Du et al.

OTHER PUBLICATIONS

Chen et al., "Image Detector Based Automatic 3D Data Labeling and Training for Vehicle Detection on Point Cloud," 2019 IEEE Intelligent Vehicles Symposium (IV), found at https://www.ram-lab.com/papers/2019/iv_2019_chen.pdf.
(Continued)

*Primary Examiner* — Nam D Pham
(74) *Attorney, Agent, or Firm* — Christopher G. Darrow; Darrow Mustafa PC

(57) ABSTRACT

Systems and methods for three-dimensional object detection are disclosed herein. One embodiment inputs, to a neural network, a two-dimensional label associated with an object to produce a Normalized-Object-Coordinate-Space (NOCS) image and a shape vector, the shape vector mapping to a continuously traversable coordinate shape space (CSS); decodes the NOCS image and the shape vector to an object model in the CSS; back-projects, in a frustum, the NOCS image to a LIDAR point cloud; identifies correspondences between the LIDAR point cloud and the object model to estimate an affine transformation between the LIDAR point cloud and the object model; iteratively refines the affine transformation using a differentiable SDF renderer; extracts automatically a three-dimensional label for the object based, at least in part, on the iteratively refined affine transformation; and performs three-dimensional object detection of the object based, at least in part, on the extracted three-dimensional label for the object.

20 Claims, 8 Drawing Sheets

(51) Int. Cl.
| | |
|---|---|
| *B60W 60/00* | (2020.01) |
| *G06T 7/30* | (2017.01) |
| *G01S 7/48* | (2006.01) |
| *G01S 17/42* | (2006.01) |
| *G01S 17/89* | (2020.01) |
| *G06N 3/04* | (2006.01) |
| *G06N 3/08* | (2006.01) |
| *G06V 20/64* | (2022.01) |

(52) U.S. Cl.
CPC ............ *G01S 7/4808* (2013.01); *G01S 17/42* (2013.01); *G01S 17/89* (2013.01); *G06N 3/04* (2013.01); *G06N 3/08* (2013.01); *G06T 7/30* (2017.01); *G06T 7/70* (2017.01); *G06V 20/64* (2022.01); *B60W 2420/42* (2013.01); *B60W 2552/00* (2020.02); *B60W 2554/404* (2020.02); *G06T 2207/10016* (2013.01); *G06T 2207/10028* (2013.01); *G06T 2207/20081* (2013.01); *G06T 2207/20084* (2013.01); *G06T 2207/30196* (2013.01); *G06T 2207/30241* (2013.01); *G06T 2207/30252* (2013.01)

(58) Field of Classification Search
CPC ......... B60W 2420/42; B60W 2552/00; B60W 2554/404; G01S 7/4802; G01S 7/4808; G01S 17/42; G01S 17/89; G01S 13/862; G01S 13/865; G01S 13/867; G01S 13/931; G01S 17/931; G06N 3/04; G06N 3/08; G06N 3/0481; G06N 3/0454; G06N 3/084; G06T 7/30; G06T 7/70; G06T 2207/10016; G06T 2207/10028; G06T 2207/20081; G06T 2207/20084; G06T 2207/30196; G06T 2207/30241; G06T 2207/30252; G06T 2207/30261; G06T 7/75; G06K 9/6272
See application file for complete search history.

(56) References Cited

OTHER PUBLICATIONS

Qi et al., "Frustum PointNets for 3D Object Detection from RGB-D Data," 2018 IEEE/CVF Conference on Computer Vision and Pattern Recognition (CVPR), found at http://openaccess.thecvf.com/content_cvpr_2018/papers/Qi_Frustum_PointNets_for_CVPR_2018_paper.pdf.
Zeng et al., "Multi-View Self-Supervised Deep Learning for 6D Pose Estimation in the Amazon Picking Challenge," 2017 IEEE International Conference on Robotics and Automation (ICRA), found at https://arxiv.org/pdf/1609.09475.pdf.
Hoermann et al., "Object Detection on Dynamic Occupancy Grid Maps Using Deep Learning and Automatic Label Generation," 2018 IEEE Intelligent Vehicles Symposium (IV), found at https://arxiv.org/pdf/1802.02202.pdf.
Liu et al., "Learning to Infer Implicit Surfaces without 3D Supervision," 33rd Conference on Neural Information Processing Systems (NeurIPS 2019), Vancouver, Canada, found at https://arxiv.org/pdf/1911.00767.pdf.
Acuna et al., "Efficient Interactive Annotation of Segmentation Datasets with Polygon-RNN++", found at: http://openaccess.thecvf.com/content_cvpr_2018/papers/Acuna_Efficient_Interactive_Annotation_CVPR_2018_paper.pdf.
Chen et al., "Learning to predict 3d objects with an interpolation-based differentiable renderer", found at arXiv:1 908.01210v2 [cs.CV] Nov. 21, 2019.
Curless et al., "A volumetric method for building complex models from range images",. In SIGGRAPH, 1996, found at: https://graphics.stanford.edu/papers/volrange/volrange.pdf.
Dosovitskiy et al., "CARLA: An open urban drivingsimulator". In CoRL, 2017, found at: arXiv:1711 03938v1 [cs.LG] Nov. 10, 2017.
Engelmann et al., "Joint object pose estimation and shape reconstruction in urban street scenes using 3D shape priors" In GCPR, 2016.
Engelmann et al., "SAMP: Shape and motion priors for 4d vehicle reconstruction" In WACV, 2017, found at: https://www.vision.rwth-aachen.de/media/papers/EngelmannWACV17_x8euNDK.pdf.
Feng et al., "Deep active learning for efficient trainingof a lidar 3d object detector" In IV, 2019, found at arXiv:1901.10609V2 [cs.RO] May 5, 2019.
Geiger et al., "Are we ready for autonomous driving? The KITTI Vision Benchmark Suite", In CVPR, 2012.
Guler et al., "Densepose: Dense human pose estimation in the wild", In CVPR, 2018.
Kato, et al., "Neural 3d mesh renderer", found at: arXiv:1711.07566v1 [cs.CV] Nov. 20, 2017.
Huang, "Adding a dimension: Annotating 3d objects with 2d data", found at: https://scale.com/blog/3d-cuboids-annotations (accessed Apr. 16, 2020).
Jafari et al., "ipose: instance-aware 6d pose estimation of partly occluded objects", found at: arXiv:1712.01924v2 [ cs.CV] Apr. 11, 2018.
Kanazawa et al., "Learning category-specific mesh reconstruction from image collections", found at arXiv:1803.07549V2 [cs.CV] Jul. 30, 2018.
Kulkarni et al., "Canonical surface mapping via geometric cycle consistency" 2019, found at: http://www.cs.cmu.edu/~nileshk/papers/csm.pdf.
Kundu et al., "3d-rcnn: Instance-level 3d object reconstruction via render-andcompare" In CVPR, 2018.
Lee et al., "Leveraging pre-trained 3d object detection models for fast ground truth generation", found at arXiv:1807.06072V1 [cs.LG] Jul. 16, 2018.
Li et al., "Differentiable monte carlo ray tracing through edge sampling", ACM Trans. Graph., vol. 37, No. 6, Article 222. Publication date: Nov. 2018.
Li et al., "Cdpn: Coordinates-based disentangled pose network for real-time rgb-based 6-dof object pose estimation" In CVPR, 2019.
Ling et al., "Fast interactive object annotation with curve-gen", found at: arXiv:1903.06874v1 [cs.CV] Mar. 16, 2019.
Liu et al., "Soft rasterizer: A differentiable renderer for image-based 3d reasoning", found at: arXiv:1904.01786v1 [cs.CV] Apr. 3, 2019.
Loper et al., "OpenDR: An approximate differentiable renderer", In ECCV, 2014.
Lorensen et al., "Marching cubes: A high resolution 3d surface construction algorithm", In SIGGRAPH '87: Proceedings of the 14th annual conference on Computer graphics and interactive techniques, Aug. 1987, pp. 163-169*.
Manhardt et al., "Roi-10d: Monocular lifting of 2d detection to 6d pose and metric shape", found at arXiv:1812.02781 v3 [cs CV] Apr. 10, 2019.
Park et al., "Deepsdf: Learning continuous signed distance functions for shape representation", found at arXiv:1901.05103v1 [cs.CV] Jan. 16, 2019.
Park et al., "Pix2pose: Pixel-wise coordinate regression of objects for 6d pose estimation" found at arXiv:1908 07433V1 [cs.CV] Aug. 20, 2019.
Peng et al., "Pvnet: Pixel-wise voting network for 6dof pose estimation" found at: arXiv:1812.11788v1 [cs.CV] Dec. 31, 2018.
Pfister et al., "Surfels: Surface elements as rendering primitives", In SIGGRAPH '00: Proceedings of the 27th annual conference on Computer graphics and interactive techniques, Jul. 2000, pp. 335-342.
Schnemann, "A generalized solution of the orthogonal procrustes problem", In Psychometrika, vol. 31, No. 1, Mar. 1966.
Stutz et al., "Learning 3d shape completion under weak supervision", found at: arXiv:1805.07290v1 [cs.CV] May 18, 2018.
Wang et al., "Normalized object coordinate space for category-level 6d object pose and size estimation", found at: arXiv:1901.02970v2 [cs.CV] Jun. 23, 2019.
Wang et al., "Object instance annotation with deep extreme level set evolution", In CVPR, 2019, found at: http://openaccess.thecvf.com/

(56) References Cited

OTHER PUBLICATIONS content_CVPR_2019/papers/Wang_Object_Instance_Annotation_With_Deep_Extreme_Level_Set_Evolution_CVPR_2019_paper.pdf.
Yu et al., "BDD100K: A diverse driving video database with scalable annotation tooling", found at; arXiv:1805.04687v1 [cs.CV] May 12, 2018.
Zakharov et al., "Dpod: Dense 6d pose object detector in rgb images", found at: synarXiv:1902.11020v3 [cs.CV] Aug. 20, 2019.
Zhang et al., "Predicting 3d human dynamics from video", found at: arXiv:1908.04781v2 [cs.CV] Aug. 20, 2019.
Zuffi et al., "Three-d safari: Learning to estimate zebra pose, shape, and texture from images in the wild", found at arXiv: 1908.07201v2 [cs.CV] Sep. 17, 2019.
Yuille et al., "Vision as bayesian inference: analysis by synthesis?", Trends in cognitive sciences,10(7):301-308, 2006.
Wu et al., "Detectron2" found at https://github.com/facebookresearch/detectron2, 2019 (accessed Apr. 20, 2020).
Simonelli et al., "Disentangling monocular 3d object detection", found at: arXiv:1905.12365v1 [cs.CV] May 29, 2019.
Paszke et al., "Automatic differentiation in pytorch", In NIPS-W, 2017.
Lang et al., "Pointpillars: Fast encoders for object detection from point clouds", found at: arXiv:1812.05784v2 [cs.LG] May 7, 2019.
He et al., "Mask R-CNN", found at: arXiv:1703.06870v1 [cs.CV] Mar. 20, 2017.
Gaidon et al., "Virtual worlds as proxy for multi-object tracking analysis", found at: arXiv: 1605.06457v1 [cs.CV] May 20, 2016.
Chen et al., "Multi-view 3d object detection network for autonomous driving", found at: LIDARarXiv: 1611.07759v2[cs.CV] Apr. 11, 2017.
Caesar et al., "nuScenes: A multimodal dataset for autonomous driving", found at: arXiv:1903.11027v3 [cs.LG] Nov. 22, 2019.

* cited by examiner

SYSTEMS AND METHODS FOR 3D OBJECT DETECTION

CROSS-REFERENCE TO RELATED APPLICATION

This application claims the benefit of U.S. Provisional Patent Application No. 62/935,246, "Autolabeling 3D Objects with Differentiable Rendering of SDF Shape Priors," filed Nov. 14, 2019, which is incorporated by reference herein in its entirety.

TECHNICAL FIELD

The subject matter described herein generally relates to robotics and machine vision and, more particularly, to systems and methods for three-dimensional (3D) object detection.

BACKGROUND

Deep learning often requires large labeled datasets to reach state-of-the-art performance. In the context of three-dimensional (3D) object detection for autonomous vehicles and other robotics applications, 3D cuboids are the preferred annotation type, since they allow for proper reasoning over all nine degrees of freedom (three degrees of freedom for each of instance location, orientation, and metric extent). However, acquiring enough labels to train 3D object detectors can be laborious and costly, as it mostly relies on a large number of human annotators. Conventional approaches to scaling up annotation pipelines include better tooling, active learning, or a combination thereof. These approaches often rely on heuristics and require humans in the loop to correct the semi-automatic labeling, especially for difficult edge cases.

SUMMARY

An example of a system for three-dimensional (3D) object detection is presented herein. The system comprises one or more processors and a memory communicably coupled to the one or more processors. The memory stores a neural network module including instructions that when executed by the one or more processors cause the one or more processors to input, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS. The memory also stores a decoder module including instructions that when executed by the one or more processors cause the one or more processors to decode the two-dimensional NOCS image and the shape vector to an object model in the continuously traversable coordinate shape space. The memory also stores an initialization module including instructions that when executed by the one or more processors cause the one or more processors to back-project, in a frustum, the two-dimensional NOCS image to a Light Detection and Ranging (LIDAR) point cloud corresponding to the input image. The initialization module also includes instructions that when executed by the one or more processors cause the one or more processors to identify one or more correspondences between the LIDAR point cloud and the object model to produce an estimate of an affine transformation between the LIDAR point cloud and the object model. The memory also includes an optimization module including instructions that when executed by the one or more processors cause the one or more processors to refine iteratively the estimate of the affine transformation via differentiable geometric and visual alignment using a differentiable SDF renderer. The memory also includes an autolabeling module including instructions that when executed by the one or more processors cause the one or more processors to extract automatically a three-dimensional label for the object in three-dimensional space based, at least in part, on the iteratively refined estimate of the affine transformation between the LIDAR point cloud and the object model. The memory also includes an object-detection module including instructions that when executed by the one or more processors cause the one or more processors to perform three-dimensional object detection of the object based, at least in part, on the extracted three-dimensional label for the object.

Another embodiment is a non-transitory computer-readable medium for three-dimensional object detection and storing instructions that when executed by one or more processors cause the one or more processors to input, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS. The instructions also cause the one or more processors to decode the two-dimensional NOCS image and the shape vector to an object model in the continuously traversable coordinate shape space. The instructions also cause the one or more processors to back-project, in a frustum, the two-dimensional NOCS image to a Light Detection and Ranging (LIDAR) point cloud corresponding to the input image. The instructions also cause the one or more processors to identify one or more correspondences between the LIDAR point cloud and the object model to produce an estimate of an affine transformation between the LIDAR point cloud and the object model. The instructions also cause the one or more processors to refine iteratively the estimate of the affine transformation via differentiable geometric and visual alignment using a differentiable SDF renderer. The instructions also cause the one or more processors to extract automatically a three-dimensional label for the object in three-dimensional space based, at least in part, on the iteratively refined estimate of the affine transformation between the LIDAR point cloud and the object model. The instructions also cause the one or more processors to perform three-dimensional object detection of the object based, at least in part, on the extracted three-dimensional label for the object.

In another embodiment, a method of three-dimensional object detection is disclosed. The method comprises inputting, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS. The method also includes decoding the two-dimensional NOCS image and the shape vector to an object model in the continuously traversable coordinate shape space. The method also includes back-projecting, in a frustum, the two-dimensional NOCS image to a Light Detection and Ranging (LIDAR) point cloud corresponding to the input image. The method also includes identifying one or more correspondences between the LIDAR point cloud and the object model to produce an estimate of an affine transformation between the LIDAR point cloud and the object model. The method also includes refining iteratively the estimate of the affine transformation via differentiable geometric and visual alignment using a differentiable SDF renderer. The method also includes extracting automatically a three-dimensional label for the object in three-dimensional space based, at least in part, on the iteratively refined estimate of the affine transformation between the LIDAR point cloud and the object model. The method also includes performing three-dimensional object detection of the object based, at least in part, on the extracted three-dimensional label for the object.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
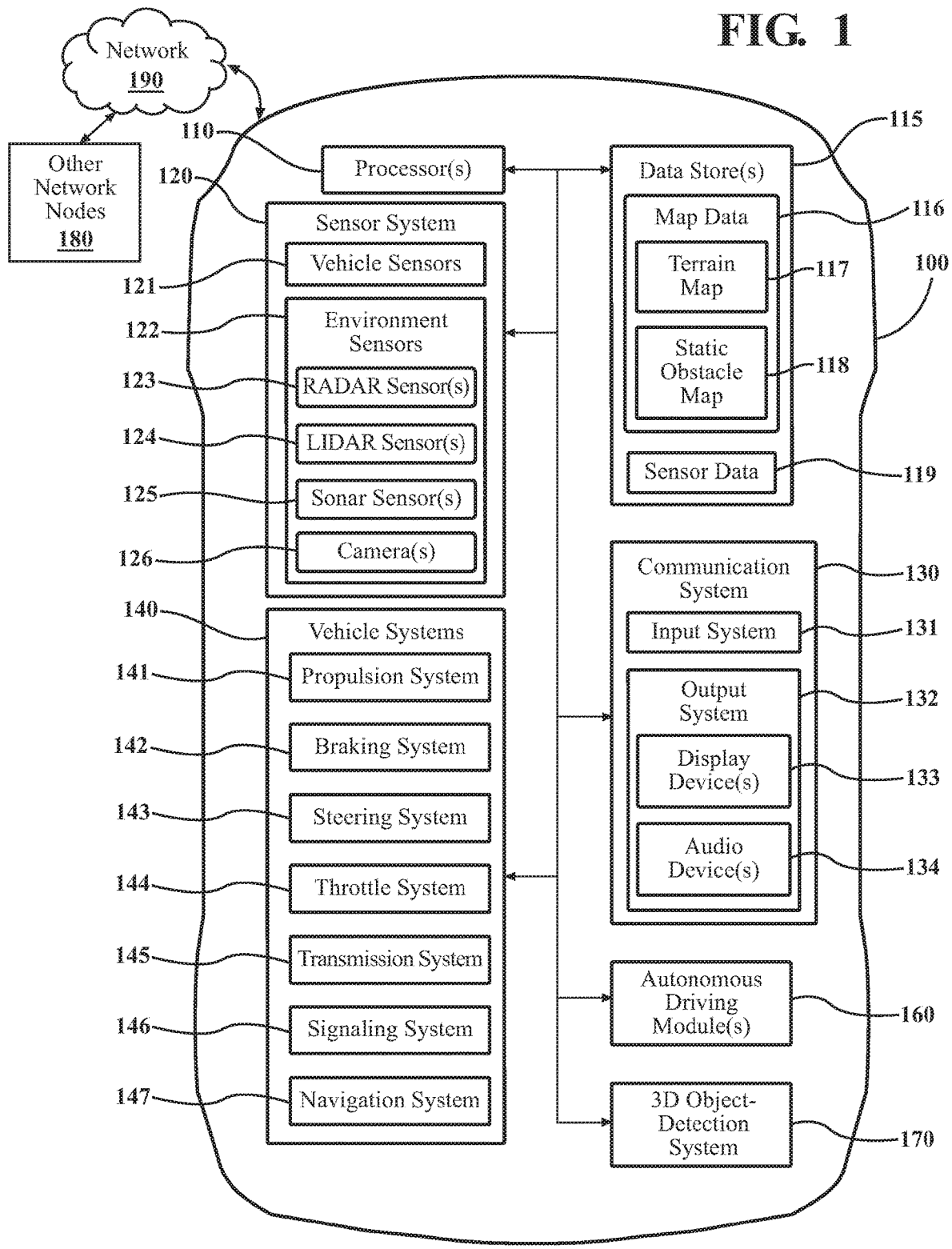
FIG. 1 illustrates one embodiment of a vehicle within which systems and methods disclosed herein may be implemented.

Various embodiments described herein improve on conventional three-dimensional (3D) annotation and object-detection systems by relying on differentiable rendering of shape priors to recover metric scale, pose, and shape of objects (e.g., vehicles, in the case of an autonomous-driving embodiment) in the wild. The embodiments described herein include a 3D autolabeling pipeline that requires, as input, only 2D detections (e.g., bounding boxes or instance masks) and sparse Light Detection and Ranging (LIDAR) point clouds, which are now ubiquitous in 3D robotics applications. In fact, the object detections themselves can even be produced by off-the-shelf 2D object detectors. These embodiments demonstrate that differentiable visual alignment, also known as "analysis-by-synthesis" or "render-and-compare," is an effective approach to autolabeling for applications such as autonomous driving and other 3D robotics applications, including humanoid robots.

More specifically, the embodiments described herein improve on conventional 3D annotation and object-detection systems in at least three ways. First, the embodiments include the notion of a continuously traversable coordinate shape space (CSS) that combines a signed-distance-field (SDF) shape space (in one embodiment, the shape-space framework known in the literature as "DeepSDF") with Normalized Object Coordinates (NOCS). This coupling makes it possible to set object shapes into correspondence, which facilitates deformable shape matching. Second, the embodiments employ a differentiable SDF renderer for comparative scene analysis over a defined shape space. Third, the embodiments include a learning curriculum for the autolabeling pipeline that begins with synthetic data (e.g., CAD models of vehicles and driving scenes, in an autonomous-driving context), mixes synthetic and real data in subsequent training loops, and progressively increases the difficulty level of the input data throughout the training loops.

In some embodiments, the autolabeling pipeline begins with a CSS neural network (herein sometimes referred to as the "CSS network") trained to predict a 2D NOCS map, as well as a shape vector, from an image patch. To bootstrap an initial version, the CSS network can be trained using synthetic data for which ground-truth NOCS and shape-vector targets can be easily acquired, and augmentations are also applied to minimize the sim2real domain gap. In these embodiments, the autolabeling loop includes (1) leveraging 2D annotations to localize instances, (2) running the CSS network on an extracted patch of an input image, (3) re-projecting NOCS into the scene via LIDAR, (4) recovering an object model from the CSS, (5) computing an approximate pose via 3D-3D correspondences, and (6) running projective and geometric alignment for refinement of the initial estimate. After processing the images in the training set, the recovered autolabels are harvested, and the CSS prediction network is retrained to gradually expand into the new domain. The process is then repeated to get increasingly better CSS predictions and, in turn, better autolabels (e.g. 3D cuboid bounding boxes) for objects. To avoid drifting with noisy autolabels, a training curriculum is employed that focuses on easy samples first and increases the difficulty level with each pass through the training loop.

Referring to FIG. 1, an example of a vehicle 100, in which systems and methods disclosed herein can be implemented, is illustrated. A vehicle 100 is only one example of an environment in which systems and methods disclosed herein can be implemented. As mentioned above, the techniques described herein have application to other areas of robotics and machine vision, including humanoid robots. The vehicle 100 can include a three-dimensional (3D) object-detection system 170 or components and/or modules thereof. As used herein, a "vehicle" is any form of motorized transport. In one or more implementations, the vehicle 100 can be an automobile. In some implementations, the vehicle 100 may be any other form of motorized transport. In various embodiments, vehicle 100 is capable of operating in a manual, semi-autonomous, parallel-autonomy, or fully autonomous mode. The vehicle 100 can include the 3D object-detection system 170 or capabilities to support or interact with the 3D object-detection system 170 and thus benefits from the functionality discussed herein. While arrangements will be described herein with respect to automobiles, it will be understood that implementations are not limited to automobiles. Instead, implementations of the principles discussed herein can be applied to any kind of vehicle and to devices and environments (e.g., robots) other than vehicles, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including 3D object-detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 180 (cloud servers, infrastructure systems, user mobile devices, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 can include radar sensor(s) 123, LIDAR sensor(s) 124, sonar sensor(s) 125, and camera(s) 126. In the embodiments described herein, image data from camera(s) 126 and LIDAR point-cloud data are of particular relevance because 3D object-detection system 170 can perform autolabeling of 3D objects and 3D object detection based on the image and related point-cloud data. In some embodiments, the input images are in red-green-blue (RGB) format. In other embodiments, a different image format may be used. Also, in some embodiments, sensor system 120 produces time-synchronized 2D image and 3D LIDAR point-cloud data of the scenes it captures. This corresponding synchronized LIDAR point-cloud data is used in combination with the image data in ways that are explained further below.

Figure 2:
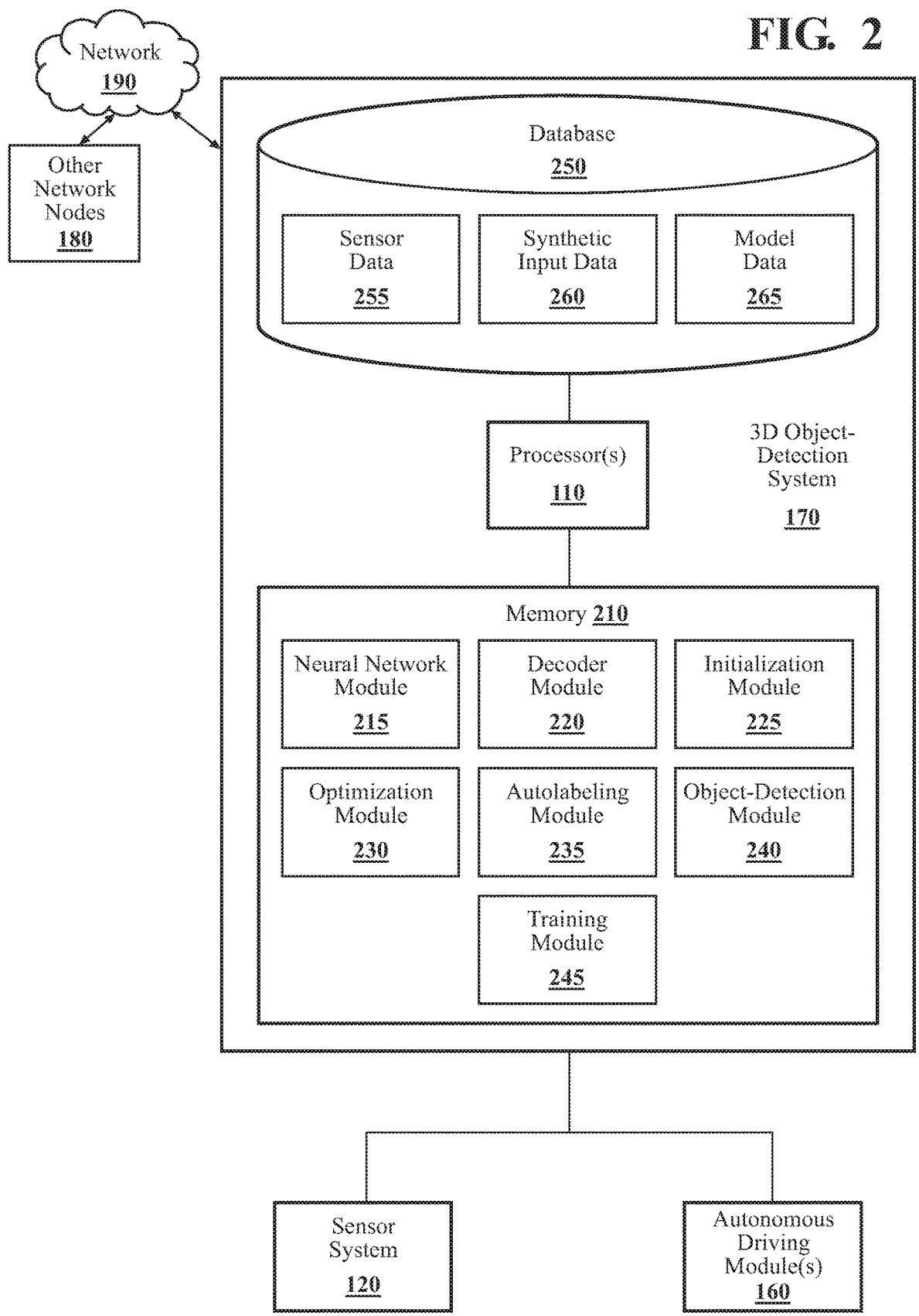
FIG. 2 illustrates one embodiment of a three-dimensional (3D) object-detection system integrated with a vehicle.

Referring to FIG. 2, one embodiment of the 3D object-detection system 170 of FIG. 1 is further illustrated. In this embodiment, 3D object-detection system 170 is shown as including one or more processors 110 from the vehicle 100 of FIG. 1. In general, the one or more processors 110 may be a part of 3D object-detection system 170, 3D object-detection system 170 may include one or more separate processors from the one or more processors 110 of the vehicle 100, or 3D object-detection system 170 may access the one or more processors 110 through a data bus or another communication path, depending on the embodiment.

In one embodiment, memory 210 stores a neural network module 215, a decoder module 220, an initialization module 225, an optimization module 230, an autolabeling module 235, an object-detection module 240, and a training module 245. The memory 210 is a random-access memory (RAM), read-only memory (ROM), a hard-disk drive, a flash memory, or other suitable memory for storing the modules 215, 220, 225, 230, 235, 240, and 245. The modules 215, 220, 225, 230, 235, 240, and 245 are, for example, computer-readable instructions that when executed by the one or more processors 110, cause the one or more processors 110 to perform the various functions disclosed herein.

As shown in FIG. 2, 3D object-detection system 170 can communicate with one or more other network nodes 180 (e.g., cloud servers, infrastructure systems, user mobile devices, etc.) via network 190. In communicating with cloud servers, infrastructure systems (traffic signals, roadside units, etc.), or user mobile devices, 3D object-detection system 170 can employ wireless communication technologies such as cellular data (LTE, 5G, etc.) or WiFi. As shown in FIG. 2, 3D object-detection system 170 can also interface and communicate with sensor system 120 and autonomous driving module(s) 160, in some embodiments.

In some embodiments, 3D object-detection system 170 stores sensor data 255 output by sensor system 120 (e.g., camera(s) 126 and LIDAR sensor(s) 124) or obtained from another source (e.g., an infrastructure device or other vehicles) in a database 250. In embodiments that include a training module 245, sensor data 255 can also include a collection of sample images as training data for training one or more neural networks. Also, in embodiments that include a training module 245, 3D object-detection system 170 can store synthetic input data 260 (part of the training data for training one or more neural networks) in database 250. In some embodiments, 3D object-detection system 170 stores, in database 250, model data 265 (e.g., model parameters, intermediate calculations, figures of merit, etc.) associated with the 3D autolabeling and object-detection operations described below.

The remainder of this description is organized as follows. First, an overview is provided of the functions performed by the various modules included in 3D object-detection system 170. Second, certain embodiments of 3D object-detection system 170 are described in greater detail, including the underlying mathematical concepts and techniques, in connection with FIGS. 3-7. Third, the methods associated with various embodiments are discussed via the flowchart of FIG. 8. Finally, a complete description of FIG. 1 is provided.

Training module 245, which pertains to a training phase of 3D object-detection system 170, generally includes instructions that when executed by the one or more processors 110 cause the one or more processors 110 to train the CSS network (the neural network discussed above) in accordance with a predetermined training curriculum. That training curriculum includes using, as training data during the first iteration of the training loop, synthetic input data 260 that includes rendered driving scenes and computer-aided-design (CAD) models of a plurality of different types of vehicles with ground-truth annotations. In embodiments in which 3D object-detection system 170 is embodied in a robot other than a vehicle, the specific subject matter of the synthetic input data 260 can be tailored to whatever kinds of objects the robot needs to be able to detect. The training curriculum also includes using, as training data during one or more iterations in a plurality of iterations performed subsequent to the first iteration of the training loop, a mixture of real data (e.g., sensor data 255) and the synthetic input data 260. That is, training module 245 can introduce real image data gradually during the process of training the CSS network. The training curriculum also includes increasing, over the plurality of iterations subsequent to the first iteration of the training loop, the difficulty level of the training data. That is, training module 245 can begin with relatively easy training data and then increase the difficulty level of the training data gradually during the training process. The training of the CSS network is discussed further below.

In some embodiments, 3D object-detection system 170 does not include training module 245. In those embodiments, the program code, parameters, and data for one or more trained neural networks can be downloaded to a 3D object-detection system 170 in a vehicle 100 or other robot from, e.g., a cloud server (see other network nodes 180 in FIGS. 1 and 2). In those embodiments, the training process is carried out somewhere other than in the robot itself (e.g., a research and development facility).

Neural network module 215 generally includes instructions that when executed by the one or more processors 110 cause the one or more processors 110 to input, to a neural network (i.e., the CSS network discussed above), a 2D label associated with an object in an input image to produce, for the object, a 2D NOCS image and a shape vector. The shape vector maps to the continuously traversable CSS mentioned above. In some embodiments, the CSS network is a convolutional neural network (CNN) that includes one or more fully connected layers at the end of the neural network. Depending on the embodiment, the 2D label associated with the object is a 2D bounding box or a 2D instance mask. The structure of the CSS network and the 2D labels are both discussed in further detail below.

In an embodiment in which 3D object-detection system 170 is integrated with a vehicle 100, the object for which an object detector produces a 2D label that is input to the CSS network can be, for example, a vehicle, a bicycle ridden by a bicyclist, a motorcycle ridden by a motorcyclist, or a pedestrian. In the broader sense, in such an embodiment, the object can be any object that sensor system 120 captures in a scene (trees, buildings, animals, etc.).

Decoder module 220 generally includes instructions that when executed by the one or more processors 110 cause the one or more processors 110 to decode the 2D NOCS image and the shape vector to an object model in the continuously traversable CSS. The 2D NOCS image is a method of representing different parts of an object (i.e., different locations or coordinates on an object). For example, in the case of an embodiment in which 3D object-detection system 170 is integrated with a vehicle 100, colors can be used to represent the different parts of a detected vehicle in a scene (e.g., blue for the right-front part of the vehicle, pink for left-front part, etc.). The colors used in the NOCS thus encode a specific location on or portion of the object. The continuously traversable CSS combines the NOCS encodings with the object models.

Initialization module 225 generally includes instructions that when executed by the one or more processors 110 cause the one or more processors 110 to back-project, in a frustum, the 2D NOCS image to a LIDAR point cloud corresponding to the input image. As explained above, in this context the LIDAR point-cloud data "corresponds" to the 2D image input data in the sense that the two are synchronized with each other (i.e., they depict the same scene and are synchronized with each other in time). Initialization module 225 also includes instructions to identify one or more correspondences between the LIDAR point cloud and the object model to produce an estimate of an affine transformation between the LIDAR point cloud and the object model. As those skilled in the art area aware, an affine transformation is a linear mapping that preserves points, straight lines, and planes. For example, sets of parallel lines remain parallel after application of an affine transformation. The estimate of the affine transformation between the LIDAR point cloud and the object model that initialization module 225 produces at this stage is an initial estimate. As explained further below, the initial estimate can then be refined through an optimization process in which the pose of the object model is more accurately determined.

Optimization module 230 generally includes instructions that when executed by the one or more processors 110 cause the one or more processors 110 to refine iteratively the estimate of the affine transformation via differentiable geometric and visual alignment using a differentiable SDF renderer. In some embodiments, the differentiable SDF renderer optimizes the estimate of the affine transformation with respect to pose, scale, and shape. The differentiable SDF renderer is discussed in greater detail below.

Figure 7:
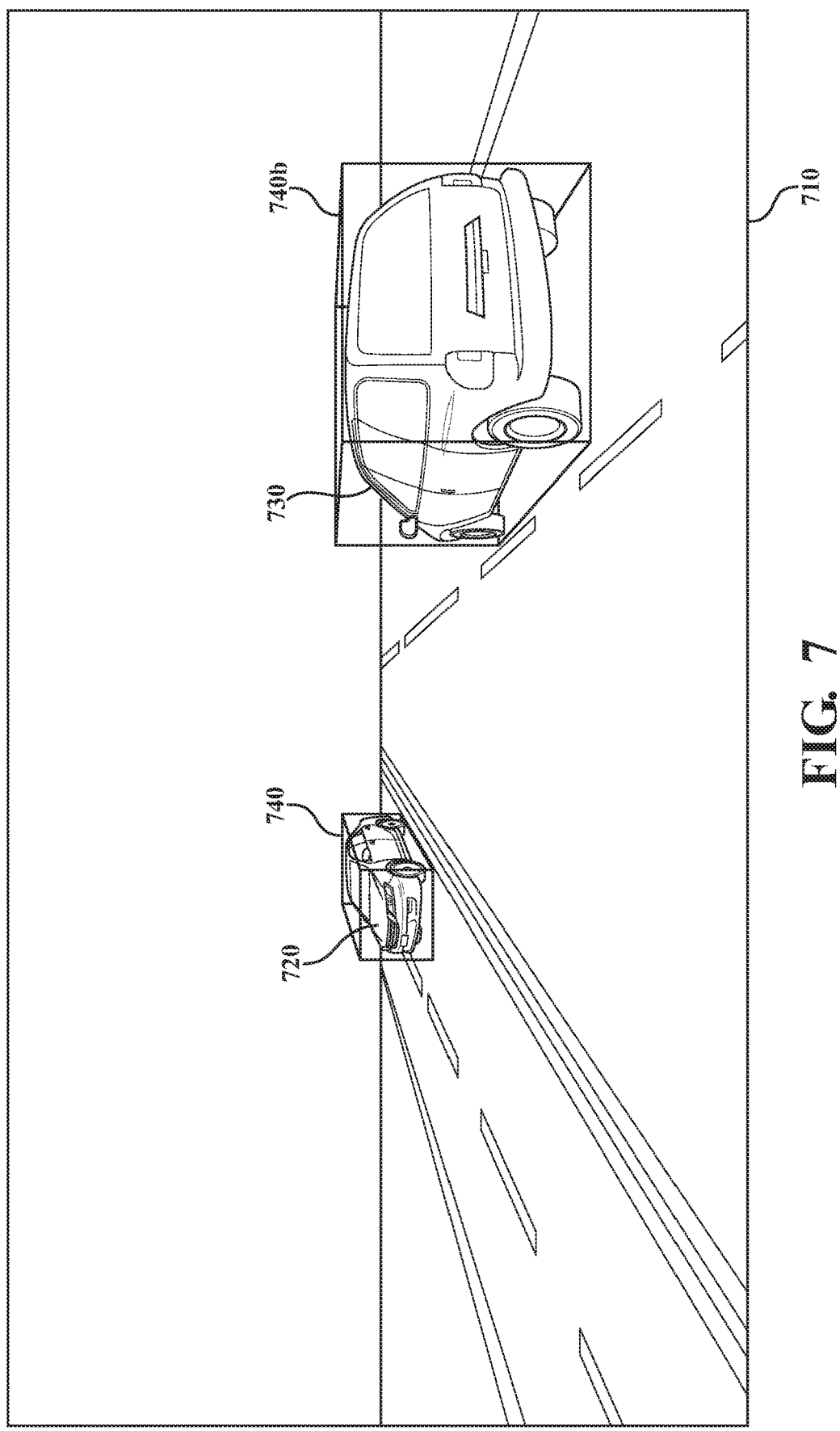
FIG. 7 shows examples of 3D labels output by a 3D autolabeling pipeline for a 3D object-detection system, in accordance with an illustrative embodiment of the invention.

Autolabeling module 235 generally includes instructions that when executed by the one or more processors 110 cause the one or more processors 110 to extract automatically a 3D label (a "3D autolabel") for the object in 3D space based, at least in part, on the iteratively refined estimate of the affine transformation between the LIDAR point cloud and the object model produced by the optimization module 230. In one embodiment, the 3D label for the object is a cuboid that encloses the object. FIG. 7, discussed below, illustrates examples of such cuboid autolabels.

Object-detection module 240 generally includes instructions that when executed by the one or more processors 110 cause the one or more processors 110 to perform 3D object detection of the object based, at least in part, on the extracted 3D label for the object.

This description proceeds next with a more detailed discussion of certain embodiments (hereinafter, "these embodiments"), including the underlying mathematical concepts and techniques. The detailed discussion of these embodiments, which focus on vehicular applications, particularly autonomous driving, begins with an overview of the automatic annotation pipeline diagrammed in FIG. 3.

Overview of 3D Autolabeling Pipeline

Figure 3:
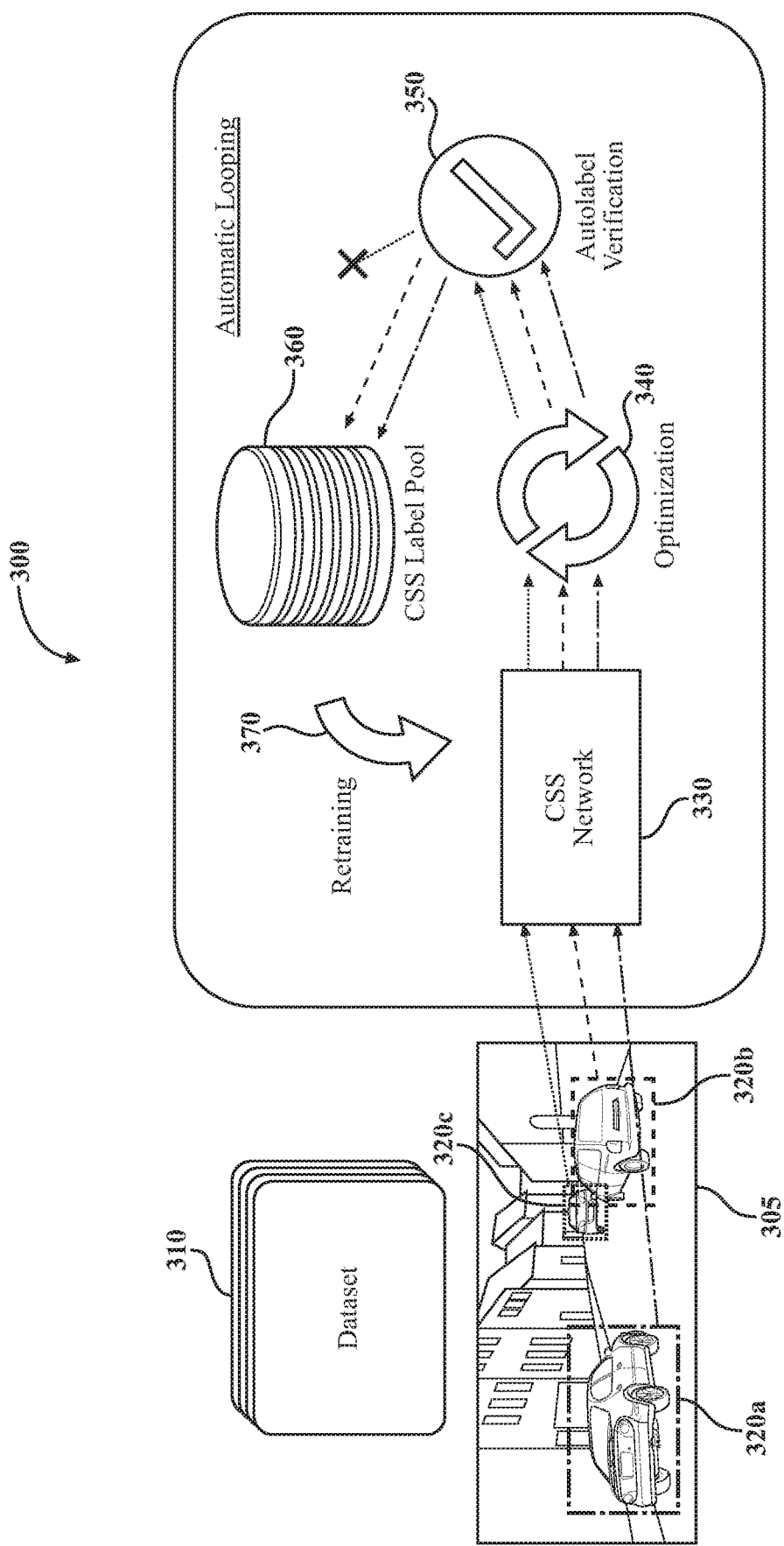
FIG. 3 is a block diagram of a 3D autolabeling pipeline for a 3D object-detection system, in accordance with an illustrative embodiment of the invention.
Figure 4:
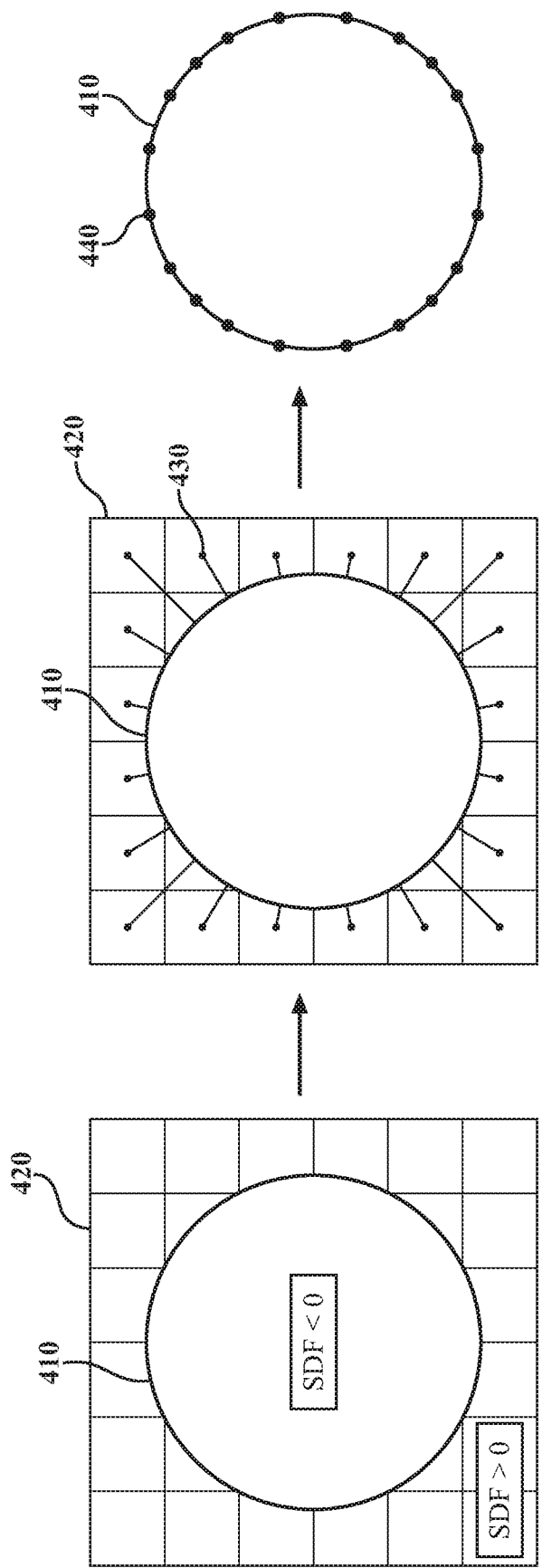
FIGS. 4A-4C illustrate surface projection of an object using signed distance fields (SDFs), in accordance with an illustrative embodiment of the invention.

FIG. 3 is a block diagram of a 3D autolabeling pipeline 300 for a 3D object-detection system 170, in accordance with an illustrative embodiment of the invention. In FIG. 3, dataset 310 potentially includes both real image and LIDAR data and synthetic input data 260. As discussed above, the synthetic input data 260 can include computer-rendered driving scenes and CAD models of a plurality of different types of vehicles with ground-truth annotations. In these embodiments, training module 245 initially uses synthetic input data 260 in training CSS Network 330. In the example of FIG. 3, a 2D object detector (not shown in FIG. 3) has detected three vehicles in input image 305 and has labeled them, respectively, with 2D label 320a, 2D label 320b, and 2D label 320c. In this example, the 2D labels are 2D bounding boxes. Neural network module 215 inputs 2D label 320a, 2D label 320b, and 2D label 320c to CSS Network 330.

As discussed above, for each 2D-labeled object, neural network module 215 produces a 2D NOCS image and a shape vector. Decoder module 220 decodes the 2D NOCS image and the shape vector to an object model in the continuously traversable CSS. Initialization module 225 then back-projects, in a frustum, the 2D NOCS image to a corresponding LIDAR point cloud, as discussed above. Initialization module 225 also identifies one or more correspondences between the LIDAR point cloud and the object model to produce an initial estimate of an affine transformation between the LIDAR point cloud and the object model. At this point, Optimization module 230 performs optimization process 340, which involves iteratively refining the estimate of the affine transformation via differentiable geometric and visual alignment using a differentiable SDF renderer. Training module 245 can then perform an autolabel verification process 350 to discard obviously incorrect autolabels before harvesting them into CSS label pool 360. Once all of the frames have been processed in a particular training loop, CSS Network 330 can be retrained (retraining 370 in FIG. 3), and the next training loop over the dataset 310 can begin. Various aspects of 3D autolabeling pipeline 300 are discussed in further detail in connection with FIGS. 4A-7 below.

Coordinate Shape Space (CSS)

These embodiments employ a coordinate-space framework known in the literature as "DeepSDF" to embed (watertight) vehicle models into a joint, compact shape-space representation with a single neural network (the CSS network discussed above). The concept is to transform input models into SDFs where each value signifies the distance to the closest surface, with positive and negative values representing exterior and interior regions, respectively. The SDF representation is desirable because it is generally easy for a neural network to learn. Eventually, DeepSDF forms a shape space of implicit surfaces with a decoder f that can be queried at spatially-continuous 3D locations $x=\{x_1, \ldots, x_N\}$ with a provided latent code z (the shape vector discussed above) to retrieve SDF values $s=\{s_1, \ldots, s_N\}$: $f(x; z)=s$.

To facilitate approximate deformable shape matching, these embodiments combine the shape space with NOCS to form a continuously traversable CSS, as discussed above. To that end, these embodiments resize the models to unit diameter and interpret 3D coordinates of the 0-level set as dense surface descriptions.

To train f, these embodiments use synthetic input data 260 including multiple CAD models of vehicles as well as rendered traffic scenes with accompanying ground-truth labels. These embodiments follow the original DeepSDF approach to training, but the latent vectors (shape vectors) are projected onto the unit sphere after each iteration (i.e., after each pass through the training loop). In the CSS, each vehicle corresponds to a single shape vector. For example, (0,1,1) might be an SUV, (0,1,0) might be a convertible, and (0,0,1) might be a Porsche. The vectors are continuous, meaning that the CSS can be continuously traversed from one vehicle to another (as if one vehicle "morphs" into another as the shape space is traversed). In these embodiments, the CSS is three dimensional, but in other embodiments it is possible to have a shape space of a different dimensionality.

Differentiable SDF Rendering

One component of the 3D autolabeling pipeline 300 is the ability to optimize objects regarding prose, scale, and shape. These functions are performed by optimization module 230, as discussed above. To that end, these embodiments include a differentiable SDF renderer. This differentiable SDF renderer avoids mesh-related problems such as connectivity or intersections and includes a different way of sampling the representation. These embodiments also employ an alternative formulation for rendering implicit surfaces that lends itself to back-propagation.

One aspect of the differentiable SDF renderer is the projection of 0-isosurface. Provided with query points $x_i$ and associated signed-distance values $s_i$, these embodiments include a differentiable way to access the implicit surface. Simply selecting query points based on their signed-distance values does not form a derivative with respect to the latent vector. Moreover, the regularly sampled locations will be only approximately on the surface. These embodiments exploit the property that deriving the SDF with respect to its location yields the normal at this point, practically computed with a backward pass:

$$n_i = \frac{\partial f(x_i; z)}{\partial x_i}.$$

Since normals provide the direction to the closest surface and signed-distance values provide the exact distance, the query location can be projected onto a 3D surface position $p_i$:

$$p_i = x_i - \frac{\partial f(x_i; z)}{\partial x_i} f(x_i; z).$$

To get clean surface projections, these embodiments disregard all points $x_i$ outside a narrow band ($|s_i|>0.03$) of the surface. A schematic explanation is provided in FIGS. 4A-4C.

FIGS. 4A-4C illustrate surface projection of an object using SDFs, in accordance with an illustrative embodiment of the invention. FIG. 4A illustrates an object surface 410 within a query grid 420. As indicated in FIG. 4A, locations interior to object surface 410 have negative SDF values, and those exterior to object surface 410 have positive SDF values. FIG. 4B illustrates the normals for points 430 exterior to object surface 410. FIG. 4C illustrates the projected object-surface points 440 that lie on object surface 410.

Another aspect of the differentiable SDF renderer is the use of surface tangent disks. In the field of computer graphics, the concept of surface elements (surfels) is a well-established alternative to connected triangular primitives. The differentiable SDF representation in these embodiments yields oriented points and can be immediately used to render surface disks. To obtain a watertight surface, disk diameters are selected that are large enough to close holes. The surface discs can be constructed as follows:

1. Given the normal of a projected point $$n_i = \frac{\partial f(p_i; z)}{\partial p_i},$$

estimate the 3D coordinates of the resulting tangent plane visible in the screen. The distance d of the plane to each 2D pixel (u, v) can be computed by solving a system of linear equations for the plane and camera projection, resulting in the following solution:

$$d = \frac{n_i \cdot p_i}{n_i \cdot K^{-1} \cdot (u, v, 1)^T},$$

where $K^{-1}$ is the inverse camera matrix, followed by back-projection to get the final 3D plane coordinate:

$$P = K^{-1} \cdot (u \cdot d, v \cdot d, d)^T$$

2. Estimate the distance between the plane vertex and surface point and clamp, if it is larger than the disc diameter: $M = \max(\text{diam} - \|p_i - P\|_2, 0)$. To ensure watertightness, the diameter from the query location density is computed: $\text{diam} = \min_{i \neq j} \|x_i - x_j\|_2 \sqrt{3}$. Performing the foregoing calculations for each pixel yields a depth map $D_1$ and a tangential distance mask $M_i$ at point $p_i$.

Another aspect of the differentiable SDF renderer is the rendering function. To generate a final rendering, these embodiments employ a function that composes layers of 2D-projected disks onto the image plane. This can include combining colors from different point primitives based on their depth values. The closer the primitive is to the camera, the stronger its contribution. These embodiments use softmax to ensure that all primitive contributions sum up to 1 at each pixel. More specifically, the rendering function is $\Im = \Sigma_i \text{NOCS}(p_i) * w_i$, where $\Im$ is the resulting image, NOCS returns coordinate coloring, and the $w_i$ are the weighting masks that define the contribution of each disk:

$$w_i = \frac{\exp(-\tilde{D}_i \sigma) M_i}{\sum_j \exp(-\tilde{D}_j \sigma) M_j},$$

where $\tilde{D}$ is the normalized depth, and $\sigma$ is a transparency constant with $\sigma \to \infty$ being completely opaque as only the closest primitive is rendered. The foregoing formulation enables gradient flow from pixels to surface points and allows image-based optimization. The foregoing optimization functions following the initialization phase can be carried out by optimization module 230.

3D Autolabeling Pipeline

One underlying principle of the autolabeling approach in these embodiments is to exploit weak labels and strong differentiable priors to recover labels of higher complexity. While this idea has wide applicability, these embodiments focus specifically on cuboid autolabeling of driving scenes. As discussed above in connection with FIG. 3, training module 245 can run multiple loops (iterations) of the 3D autolabeling pipeline 300 during a training phase. In the first training loop, the CSS label pool 360 includes entirely synthetic labels, and the trained CSS network 330 is not yet well adapted to real imagery. The results can be noisy NOCS predictions that are reliable only for well-behaved object instances in the scene. Consequently, training module 245 directs a predetermined training curriculum in which the CSS Network 330 is first exposed to easy annotations, and training module 245 increases the difficulty over subsequent training loops. In these embodiments, the difficulty of an annotation can be defined by measuring the pixel sizes of the 2D label, the amount of intersection with other 2D labels, and whether the 2D label touches the border of the image (often indicating object truncation). Training module 245 includes thresholds for these criteria to define a curriculum of increasing difficulty.

The CSS Network 330 is derived from a ResNet18 backbone and follows an encoder-decoder structure, processing 128×128 input patches to output a NOCS map of the same size and a 3D shape vector. Additional details regarding the structure of the CSS Network 330 are provided below in connection with the discussion of FIG. 6. Before the first annotation loop, training module 245 trains CSS Network 330 to infer 2D NOCS maps and shape vectors from patches. As mentioned above, such a mapping can be bootstrapped from the synthetic input data 260.

Figure 5:
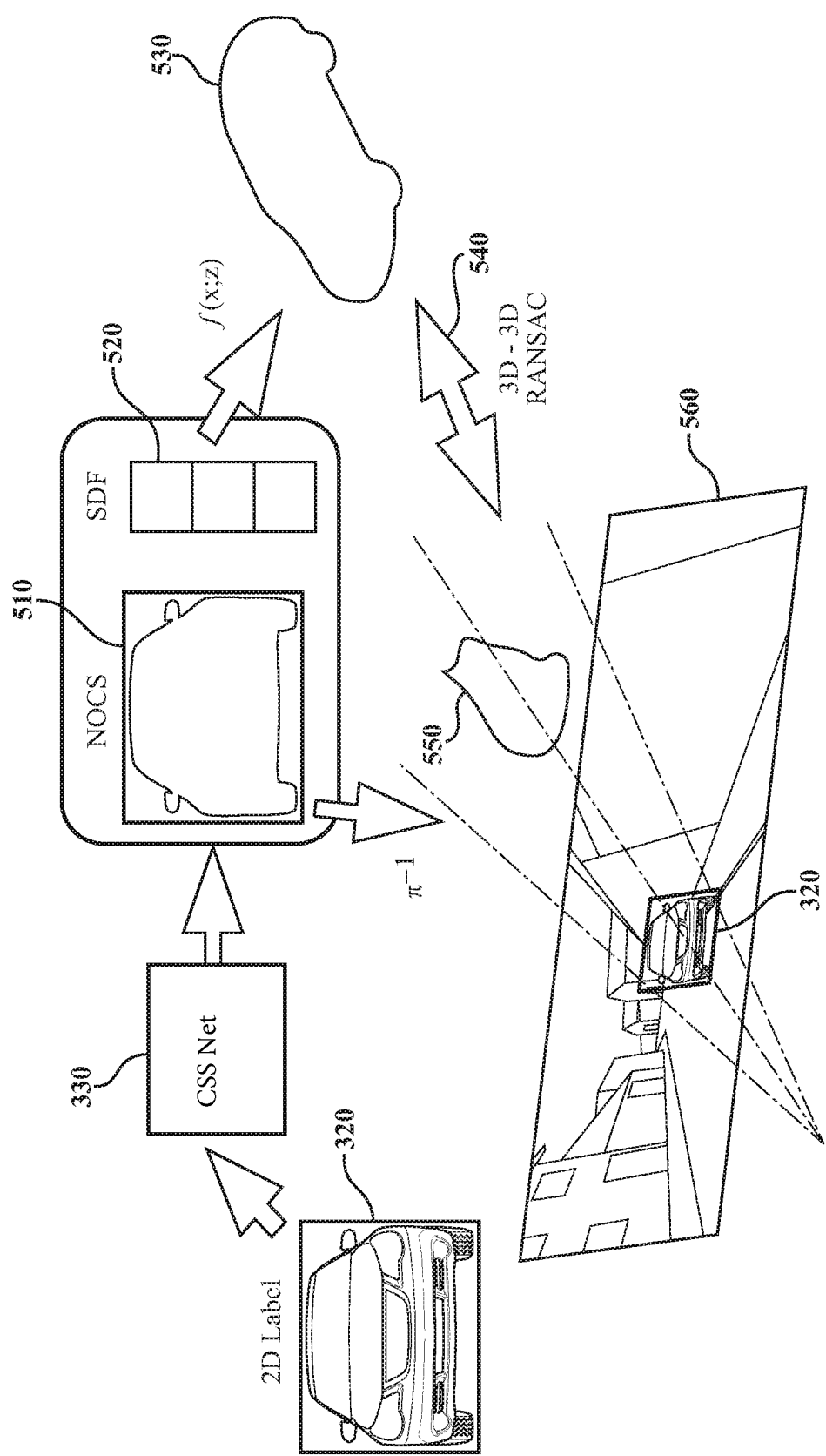
FIG. 5 is a diagram of the initialization portion of a 3D autolabeling pipeline for a 3D object-detection system, in accordance with an illustrative embodiment of the invention.

FIG. 5 is a diagram of the initialization portion of a 3D autolabeling pipeline for a 3D object-detection system 170, in accordance with an illustrative embodiment of the invention. For a given image patch (see the image patch from input image 560 bounded by 2D label 320 in FIG. 5), neural network module 215, using CSS Network 330, infers 2D NOCS map $\mathcal{M}$ (510) and shape vector z (520). Decoder module 220 decodes z into a SDF and retrieves the 3D surface points $p = \{p_1, \ldots, p_N\}$ of the object model 530 in its local frame, for which decoder module 220 computes the NOCS coordinates $p^c = \{p_1^c, \ldots, p_n^c\}$. Initialization module 225 also projects the 3D LIDAR points $l = \{l_1, \ldots, l_k\}$ (550) contained inside the frustum onto the patch and collects the corresponding NOCS coordinates $l^c$. To estimate an initial pose and scale, initialization module 225 establishes 3D-3D correspondences between p and l to estimate an initial affine transformation between the points l of the LIDAR point cloud and the points p of the object model. To do so, initialization module 225 finds, for each $p_i$, its nearest neighbor from NOCS distances: $j^* = \mathrm{argmin}_j \|p_i^c - l_j^c\|$ and keeps the result if $\|p_i^c - l_{j^*}^c\| < 0.2$. Finally, initialization module 225 can run a process known in the literature as Procrustes in conjunction with a Random Sample Consensus (RANSAC) algorithm to estimate pose (R, t) and scale s. These operations are represented by 3D-3D RANSAC 540 in FIG. 5.

At this point, optimization module 230 can begin differentiable optimization over complementary 2D and 3D evidence. While projective 2D information provides strong cues for orientation and shape, 3D points allow reasoning over scale and translation. At each iteration, optimization module 230 decodes the current shape vector estimate 2, extracts surface points $p_i$ and transforms them with the current estimates for pose and scale: $\hat{p}_i = (\hat{R} \cdot \hat{s}) \cdot p_i + \hat{t}$. This process results in a refined or optimized affine transformation between the points l of the LIDAR point cloud and the points p of the object model.

Given the surface-model points in the scene frame, the individual 2D and 3D losses are computed as follows. For the 2D loss, optimization module 230 employs the differentiable SDF renderer discussed above to produce a rendering $\mathcal{R}$ for which maximum alignment with $\mathcal{M}$ is sought. Since the predicted $\mathcal{M}$ can be noisy (especially during the first training loop), minimizing dissimilarity ($\min \|\mathcal{M} - \mathcal{R}\|$) can yield unsatisfying solutions. Instead, optimization module 230 determines, for each rendered spatial pixel $r_i$ in $\mathcal{R}$, the closest NOCS-space neighbor $\mathcal{M}$, in named $m_j$, and sets them in correspondence if their NOCS distance is below a threshold. To allow gradient flow, optimization module 230 uses their spatial indices to resample the image locally. The loss is then the mean distance over all such correspondences $C_{2D}$ in NOCS space:

$$loss_{2D} = \frac{1}{|C_{2D}|} \sum_{(i,j) \in C_{2D}} \|\mathcal{R}(r_i) - \mathcal{M}(m_j)\|.$$

For the 3D loss, for each $\hat{p}_i$, optimization module 230 determines the nearest neighbor from l and keeps it if it is closer than 0.25 m. Since initialization module 225 generally produces good initializations, outliers in the optimization can be avoided through the use of a tight threshold. The 3D loss is the mean distance over all correspondences $C_{3D}$:

$$loss_{3D} = \frac{1}{|C_{3D}|} \sum_{(i,j) \in C_{3D}} \|\hat{p}_i - l_j\|.$$

Altogether, the final criterion is the sum of both losses, in these embodiments: loss=$loss_{2D}$+$loss_{3D}$. In these embodiments, the terms are not balanced (e.g., weighted) because both loss terms work with similar magnitudes.

Referring to autolabel verification process 350 in FIG. 3, the optimization framework may lead to incorrect results at times, resulting in a need to minimize the influence of incorrectly-inferred autolabels. To that end, in these embodiments, training module 245 enforces geometrical and projective verification to remove the worst autolabels (e.g., cuboids). Training module 245 measures the number of LIDAR points that are in a narrow band (0.2 m) around the surface of the autolabel and rejects it if fewer than 60% are outside this band. Furthermore, training module 245 defines a projective constraint in which autolabels are rejected if the rendered mask's IoU (Intersection Over Union) with the provided 2D label falls below 70%.

In these embodiments, the autolabels that survive autolabel verification process 350 are harvested and added to the CSS label pool 360. After the first training loop, there is a mixture of synthetic and real samples, in subsequent training loops, that are used to retrain CSS Network 330. Over multiple self-improving training loops, CSS Network 330 is retrained, leading to better initializations and more accurate autolabels.

FIG. 7 shows examples of 3D labels output by a 3D autolabeling pipeline 300 for a 3D object-detection system 170, in accordance with an illustrative embodiment of the invention. The scene depicted in input image 710 includes object 720 (a vehicle) and object 730 (another vehicle). In this example, autolabeling module 235 has extracted 3D label 740a for object 720 and 3D label 740b for object 730. FIG. 7 illustrates that the 3D labels output to a 3D object detector (e.g., object-detection module 240) are cuboids (3D bounding boxes), in this embodiment.

3D Object Detection

In these embodiments, 3D cuboid autolabels are not the final goal but rather a means to an end—namely, 3D object detection. As those skilled in the art are aware, once autolabeling module 235 has automatically extracted a 3D label (e.g., a cuboid) for an object, it is a relatively simple matter for object-detection module 240 to perform 3D object detection of the object based, at least in part, on the extracted 3D label for the object.

Additional Implementation Details Regarding Pipeline Components

Figure 6:
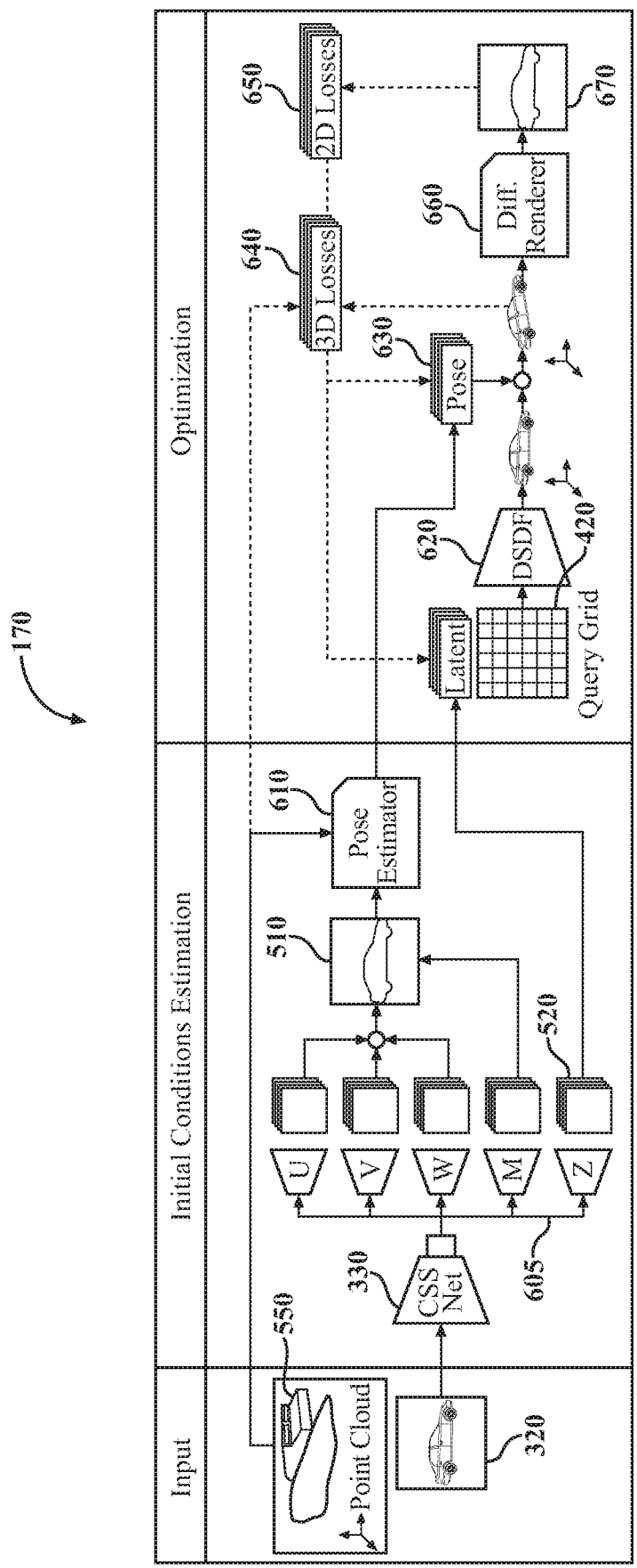
FIG. 6 illustrates a system architecture of a 3D autolabeling pipeline for a 3D object-detection system, in accordance with an illustrative embodiment of the invention.

FIG. 6 illustrates a system architecture of a 3D autolabeling pipeline for a 3D object-detection system 170, in accordance with an illustrative embodiment of the invention. As mentioned above, in these embodiments, the CSS Network 330 includes a ResNet18 backbone architecture. In these embodiments, the decoders use bilinear interpolation as an upsampling operation rather than deconvolution to decrease the number of parameters and the required number of computations. Each upsampling is followed by concatenation of the output feature map with the feature map from the previous level and one convolutional layer. Since CSS Network 330 is trained on synthetic input data 260, it can be initialized with ImageNet weights, and the first five layers are frozen to prevent overfitting to peculiarities of the rendered data. Five heads 605 of CSS Network 330 are responsible for the output of U, V, and W channels of the NOCS as well as the object's mask (510) and its latent vector (shape vector 520), encoding its DeepSDF shape.

The pose estimation block 610 is based on 3D-3D correspondence estimation. The procedure is defined as follows: CSS Network 330 outputs NOCS, mapping each RGB pixel to a 3D location on the object's surface. The NOCS are back-projected onto the LIDAR frustum points 550 using the provided camera parameters. Additionally, CSS Network 330 outputs a latent vector (shape vector 520), which is then fed to the DeepSDF network 620 and transformed to a surface point cloud using 0-isosurface projection, as discussed above. Since the DeepSDF network 620 is trained to output normalized models placed at the origin, each point on the resulting model surface represents NOCS. At this point, the system is ready to proceed with pose estimation.

NOCS are used to establish correspondences between frustum points and model points. Back-projected frustum NOCS are compared to the predicted model coordinates, and nearest neighbors for each frustum point are estimated. RANSAC can be used for robust outlier rejection. At each iteration, four random points (n) are selected from the set of correspondences and fed to the Procrustes algorithm, providing initial estimates for the pose and scale of the model (i.e., an initial estimate of an affine transformation). In these embodiments, the following RANSAC parameters can be used: the number of iterations k is based on a standard function of the desired probability of success p using a theoretical result:

$$k = \frac{\log(1-p)}{\log(1-w^n)},$$

where w is the inlier probability and n represents the independently selected data points. In one embodiment, p=0.9 and w=0.7.

In these embodiments, a threshold of 0.2 m is used to estimate the inliers and choose the best fit. The final pose and scale of the initial affine transformation discussed above are computed based on the inliers of the best fit.

Given the output of CSS Network 330 and pose initialization, optimization module 230 proceeds with the optimization stage (refer once again to FIG. 6). By concatenating the latent vector z (520) with the query 3D grid x (420), the input is formed for the DeepSDF network 620. The DeepSDF network 620 outputs SDF values for each query point on the query grid 420, which are used for the 0-isosurface projection, providing a dense surface-point cloud. The resulting point cloud is then transformed using the estimated pose and scale coming from the pose estimator 610. The points that should not be visible from the given camera view can be filtered using simple back-face culling, since surface normals have been already computed for 0-isosurface projection. At this stage, optimization module 230 can apply 3D losses between the resulting transformed point cloud and the input LIDAR frustum points. The surface point cloud is also used as an input to the differentiable renderer 660, which renders NOCS as RGB and applies 2D losses between the CSS Network's (330) NOCS prediction and the renderer's (660) output NOCS. The latent vector (520) and the pose (630) are then updated, and the process is repeated until termination.

The 3D losses discussed above support obtaining a precise pose/shape alignment with the frustum points. However, in some cases, only a few points are available, resulting in poor alignment results. The 2D losses, on the other hand, enable precise alignment in the screen space over dense pixels but are generally unsuitable for 3D scale and translation optimization and rely heavily on their initial estimates. The combination of the two losses (2D and 3D) provides the best of both worlds: dense 2D alignment and robust scale/translation estimation.

Figure 8:
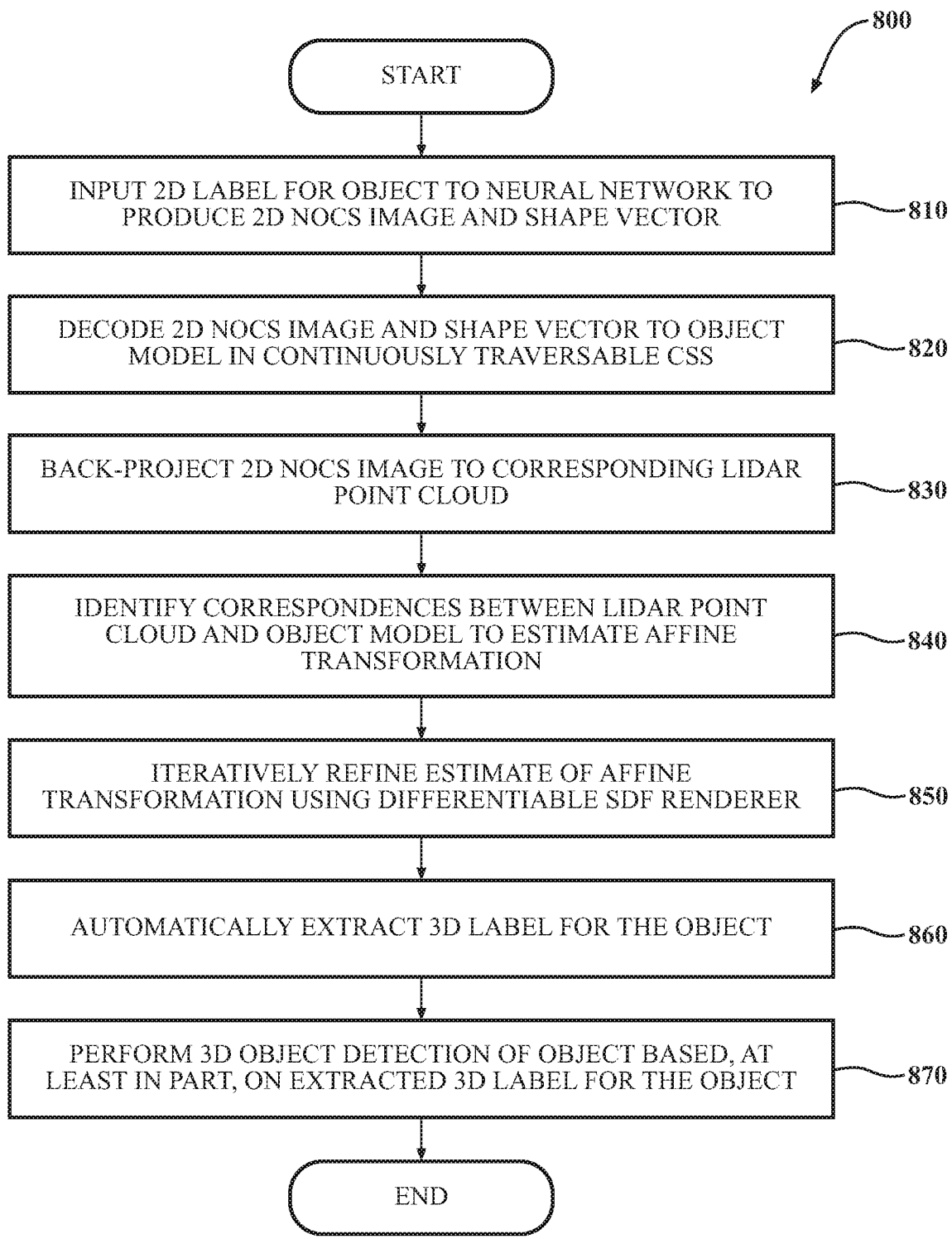
FIG. 8 is a flowchart of a method of 3D object detection, in accordance with an illustrative embodiment of the invention.

FIG. 8 is a flowchart of a method 800 of 3D object detection, in accordance with an illustrative embodiment of the invention. Method 800 will be discussed from the perspective of 3D object-detection system 170 in FIG. 2. While method 800 is discussed in combination with 3D object-detection system 170, it should be appreciated that method 800 is not limited to being implemented within 3D object-detection system 170, but 3D object-detection system 170 is instead one example of a system that may implement method 800.

At block 810, neural network module 215 inputs, to a neural network (e.g., CSS Network 330 discussed above), a 2D label 320 associated with an object in an input image to produce, for the object, a 2D NOCS image 510 and a shape vector (also referred to herein as a "latent vector") 520, the shape vector 520 mapping to a continuously traversable CSS that combines a SDF shape space with NOCS. The shape vector 520 maps to the continuously traversable CSS discussed above. In some embodiments, the CSS network 330 is a CNN that includes one or more fully connected layers at the end of the neural network. Depending on the embodiment, the 2D label associated with the object is a 2D bounding box or a 2D instance mask.

At block 820, decoder module 220 decodes the 2D NOCS image 510 and the shape vector 520 to an object model 530 in the continuously traversable CSS. As discussed above, the 2D NOCS image 510 is a method of representing different parts of an object (i.e., different locations or coordinates on an object). For example, in the case of an embodiment in which 3D object-detection system 170 is integrated with a vehicle 100, colors can be used to represent the different parts of a detected vehicle in a scene (e.g., blue for the right-front part of the vehicle, pink for left-front part, etc.). The colors used in the NOCS thus encode a specific location on or portion of the object (the detected vehicle). The continuously traversable CSS combines these NOCS encodings with the object models.

At block 830, initialization module 225 back-projects, in a frustum, the 2D NOCS image to a LIDAR point cloud 550 corresponding to the input image 305. As explained above, in this context the LIDAR point-cloud data 550 "corresponds" to the 2D image input data 305 in the sense that the two are synchronized with each other (i.e., they depict the same scene and are synchronized with each other in time).

At block 840, initialization module 225 identifies one or more correspondences between the LIDAR point cloud 550 and the object model 530 to produce an estimate of an affine transformation between the LIDAR point cloud 550 and the object model 530. As discussed above, the estimate of the affine transformation between the LIDAR point cloud 550 and the object model 530 that initialization module 225 produces at this stage is an initial estimate. As also discussed above, the initial estimate can then be refined through an optimization process.

At block 850, optimization module 230 iteratively refines the estimate of the affine transformation via differentiable geometric and visual alignment using a differentiable SDF renderer. In some embodiments, the differentiable SDF renderer optimizes the estimate of the affine transformation with respect to pose, scale, and shape. The specific techniques employed in the SDF renderer are discussed above.

At block 860, autolabeling module 235 automatically extracts a 3D label for the object in 3D space based, at least in part, on the iteratively refined estimate of the affine transformation between the LIDAR point cloud and the object model obtained at block 850. In one embodiment, the 3D label for the object is a cuboid that encloses the object. This is illustrated in FIG. 7.

At block 870, object-detection module 240 performs 3D object detection of the object based, at least in part, on the extracted 3D label for the object. Such 3D object detection has application in a variety of robotics applications, including autonomous driving.

In some embodiments, method 800 includes additional actions that are not shown in FIG. 8. For example, in some embodiments, training module 245 trains the CSS network 330 in accordance with a predetermined training curriculum. As discussed above, that training curriculum includes using, as training data during the first iteration of the training loop, synthetic input data 260 that includes rendered driving scenes and CAD models of a plurality of different types of vehicles with ground-truth annotations. In embodiments in which 3D object-detection system 170 is embodied in a robot other than a vehicle, the specific subject matter of the synthetic input data 260 can be tailored to whatever kinds of objects the robot needs to be able to detect. The training curriculum also includes using, as training data during one or more iterations in a plurality of iterations performed subsequent to the first iteration of the training loop, a mixture of real data and the synthetic data. That is, training module 245 can introduce real image data gradually during the process of training the CSS network. The training curriculum also includes increasing, over the plurality of iterations subsequent to the first iteration of the training loop, the difficulty level of the training data.

Though the foregoing discussion of method 800 focuses on a particular object in the input image 305, the same functions leading ultimately to 3D autolabeling and 3D objection detection of the object can be performed for each of a plurality of objects in the input image, where the input image includes multiple objects of interest.

As discussed above, in some embodiments, 3D object-detection system 170 is integrated with a vehicle. In some of those embodiments, the vehicle is an autonomous vehicle that is controlled by autonomous driving module(s) 160. 3D object-detection system 170 may, in other embodiments, be integrated with a variety of other kinds of robots, including humanoid robots.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-8, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for three-dimensional object detection, the system comprising:
one or more processors; and
a memory communicably coupled to the one or more processors and storing:
a neural network module including instructions that when executed by the one or more processors cause the one or more processors to input, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS;
a decoder module including instructions that when executed by the one or more processors cause the one or more processors to decode the two-dimensional NOCS image and the shape vector to an object model in the continuously traversable coordinate shape space;
an initialization module including instructions that when executed by the one or more processors cause the one or more processors to:
back-project, in a frustum, the two-dimensional NOCS image to a Light Detection and Ranging (LIDAR) point cloud corresponding to the input image; and
identify one or more correspondences between the LIDAR point cloud and the object model to produce an estimate of an affine transformation between the LIDAR point cloud and the object model;
an optimization module including instructions that when executed by the one or more processors cause the one or more processors to refine iteratively the estimate of the affine transformation via differentiable geometric and visual alignment using a differentiable SDF renderer;
an autolabeling module including instructions that when executed by the one or more processors cause the one or more processors to extract automatically a three-dimensional label for the object in three-dimensional space based, at least in part, on the iteratively refined estimate of the affine transformation between the LIDAR point cloud and the object model; and
an object-detection module including instructions that when executed by the one or more processors cause the one or more processors to perform three-dimensional object detection of the object based, at least in part, on the extracted three-dimensional label for the object.

2. The system of claim 1, further comprising a training module including instructions that when executed by the one or more processors cause the one or more processors, in accordance with a predetermined training curriculum for training the neural network, to:
use, as training data during a first iteration of a training loop, synthetic data that includes rendered driving scenes and computer-aided-design (CAD) models of a plurality of different types of vehicles with ground-truth annotations;
use, as training data during one or more iterations in a plurality of iterations subsequent to the first iteration of the training loop, a mixture of real data and the synthetic data; and
increase, over the plurality of iterations subsequent to the first iteration of the training loop, a difficulty level of the training data.

3. The system of claim 1, wherein the two-dimensional label associated with the object is one of a two-dimensional bounding box and a two-dimensional instance mask.

4. The system of claim 1, wherein the three-dimensional label for the object is a cuboid that encloses the object.

5. The system of claim 1, wherein the neural network is a convolutional neural network that includes one or more fully connected layers at an end of the neural network.

6. The system of claim 1, wherein the instructions in the optimization module to refine iteratively the estimate of the affine transformation via differentiable geometric and visual alignment using the differentiable SDF renderer include instructions to optimize the estimate of the affine transformation between the LIDAR point cloud and the object model with respect to pose, scale, and shape.

7. The system of claim 1, wherein the object is one of a vehicle, a bicycle ridden by a bicyclist, a motorcycle ridden by a motorcyclist, and a pedestrian.

8. The system of claim 1, wherein the system is integrated with a vehicle.

9. The system of claim 8, wherein the vehicle is an autonomous vehicle.

10. A non-transitory computer-readable medium for three-dimensional object detection and storing instructions that when executed by one or more processors cause the one or more processors to:
input, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS;
decode the two-dimensional NOCS image and the shape vector to an object model in the continuously traversable coordinate shape space;
back-project, in a frustum, the two-dimensional NOCS image to a Light Detection and Ranging (LIDAR) point cloud corresponding to the input image;
identify one or more correspondences between the LIDAR point cloud and the object model to produce an estimate of an affine transformation between the LIDAR point cloud and the object model;
refine iteratively the estimate of the affine transformation via differentiable geometric and visual alignment using a differentiable SDF renderer;
extract automatically a three-dimensional label for the object in three-dimensional space based, at least in part, on the iteratively refined estimate of the affine transformation between the LIDAR point cloud and the object model; and
perform three-dimensional object detection of the object based, at least in part, on the extracted three-dimensional label for the object.

11. The non-transitory computer-readable medium of claim 10, further comprising instructions that when executed by the one or more processors cause the one or more processors, in accordance with a predetermined training curriculum for training the neural network, to:
use, as training data during a first iteration of a training loop, synthetic data that includes rendered driving scenes and computer-aided-design (CAD) models of a plurality of different types of vehicles with ground-truth annotations;
use, as training data during one or more iterations in a plurality of iterations subsequent to the first iteration of the training loop, a mixture of real data and the synthetic data; and
increase, over the plurality of iterations subsequent to the first iteration of the training loop, a difficulty level of the training data.

12. The non-transitory computer-readable medium of claim 10, wherein the neural network is a convolutional neural network that includes one or more fully connected layers at an end of the neural network.

13. The non-transitory computer-readable medium of claim 10, wherein the instructions to refine iteratively the estimate of the affine transformation via differentiable geometric and visual alignment using the differentiable SDF renderer include instructions to optimize the estimate of the affine transformation between the LIDAR point cloud and the object model with respect to pose, scale, and shape.

14. A method of three-dimensional object detection, the method comprising:
inputting, to a neural network, a two-dimensional label associated with an object in an input image to produce, for the object, a two-dimensional Normalized-Object-Coordinate-Space (NOCS) image and a shape vector, the shape vector mapping to a continuously traversable coordinate shape space that combines a signed-distance-field (SDF) shape space with NOCS;
decoding the two-dimensional NOCS image and the shape vector to an object model in the continuously traversable coordinate shape space;
back-projecting, in a frustum, the two-dimensional NOCS image to a Light Detection and Ranging (LIDAR) point cloud corresponding to the input image;
identifying one or more correspondences between the LIDAR point cloud and the object model to produce an estimate of an affine transformation between the LIDAR point cloud and the object model;
refining iteratively the estimate of the affine transformation via differentiable geometric and visual alignment using a differentiable SDF renderer;
extracting automatically a three-dimensional label for the object in three-dimensional space based, at least in part, on the iteratively refined estimate of the affine transformation between the LIDAR point cloud and the object model; and
performing three-dimensional object detection of the object based, at least in part, on the extracted three-dimensional label for the object.

15. The method of claim 14, further comprising training the neural network in accordance with a training curriculum that includes:
using, as training data during a first iteration of a training loop, synthetic data that includes rendered driving scenes and computer-aided-design (CAD) models of a plurality of different types of vehicles with ground-truth annotations;
using, as training data during one or more iterations in a plurality of iterations subsequent to the first iteration of the training loop, a mixture of real data and the synthetic data; and
increasing, over the plurality of iterations subsequent to the first iteration of the training loop, a difficulty level of the training data.

16. The method of claim 14, wherein the two-dimensional label associated with the object is one of a two-dimensional bounding box and a two-dimensional instance mask.

17. The method of claim 14, wherein the three-dimensional label for the object is a cuboid that encloses the object.

18. The method of claim 14, wherein the neural network is a convolutional neural network that includes one or more fully connected layers at an end of the neural network.

19. The method of claim 14, wherein the refining optimizes the estimate of the affine transformation between the LIDAR point cloud and the object model with respect to pose, scale, and shape.

20. The method of claim 14, wherein the object is one of a vehicle, a bicycle ridden by a bicyclist, a motorcycle ridden by a motorcyclist, and a pedestrian.

* * * * *